INVENTORS
Marc Griffon du Bellay
Gabriel Boutillon
BY Webb Burden Robinson & Webb
ATTORNEYS

United States Patent Office 3,450,493
Patented June 17, 1969

3,450,493
PROCESS FOR THE PRODUCTION OF CHLORITES OF ALKALI AND ALKALINE-EARTH METALS
Marc Griffon du Bellay, Saint-Genis-Laval, and Gabriel Boutillon, Sainte-Foy-les-Lyon, France, assignors to Ugine Kuhlmann, Paris, France, a corporation of France
Filed May 25, 1966, Ser. No. 552,773
Claims priority, application France, May 28, 1965, 18,632
Int. Cl. C01b *11/10;* C01d *3/00*
U.S. Cl. 23—85                    5 Claims

ABSTRACT OF THE DISCLOSURE

An improvement in the production of alkali metal and alkaline earth metal chlorites by absorption of chlorine dioxide in an aqueous medium of an alkaline hydroxide agent and a reducing agent, wherein two measurements of the medium are made to determine the excess or deficiency of the alkaline and reducing agents, one measurement being the redox potential of the medium with or without the presence of one of the agents and the other measurement being either the pH or redox potential of the medium after the addition of at least one of the agents.

---

Figure 1:
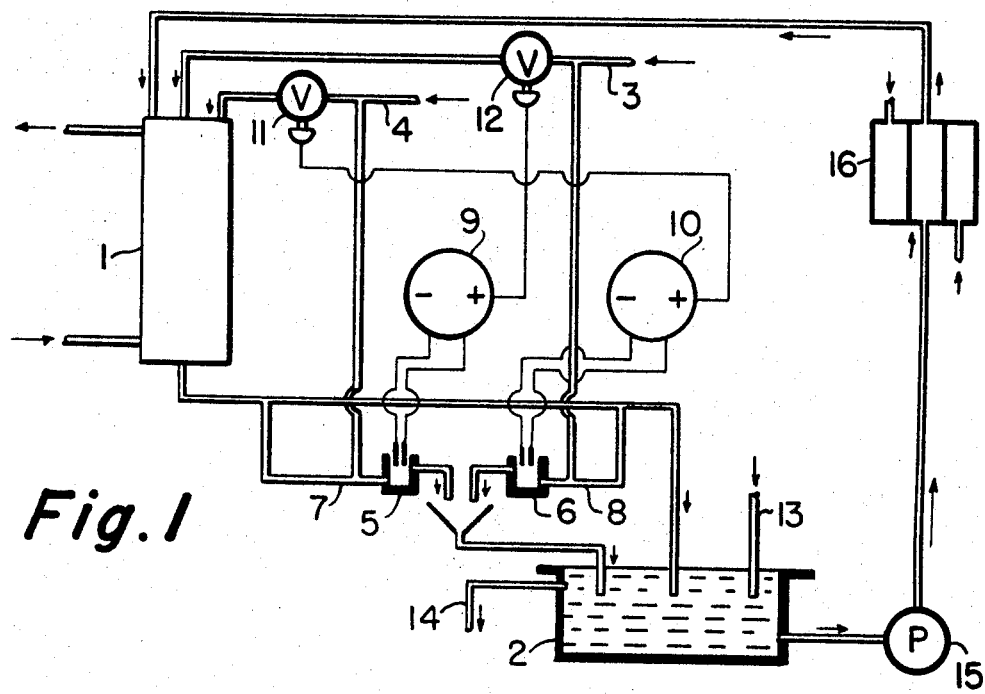

Preparation of solutions of chloride of an alkali metal or alkaline-earth metal by absorbing chlorine dioxide, generally diluted in an inert gas, in a solution or an aqueous suspension of hydroxide of the corresponding metal, is known. The absorption in a solution containing only the hydroxide, an alkaline agent, corresponds to the reaction:

(I)   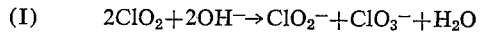
$$2ClO_2 + 2OH^- \rightarrow ClO_2^- + ClO_3^- + H_2O$$

This reaction is slow and gives only one mole of chlorite for two moles of chlorine dioxide.

The process is improved by utilizing, together with the alkaline agent, a reducing agent. The reaction is then:

(II)   $2ClO_2 + 2OH^- + \text{Red.} \rightarrow 2ClO_2^- + H_2O + O$ Red.

This reaction is rapid and obtains one chlorite mole for one mole of chlorine dioxide.

Satisfactory reducing agents include lead oxide, carbon black, amalgams of alkaline metals and hydrogen peroxide.

In the case of hydrogen peroxide, the reaction is as follows:

(III)   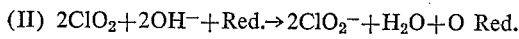
$$2ClO_2 + 2OH^- + H_2O_2 \rightarrow 2ClO_2^- + 2H_2O + O_2$$

The hydrogen peroxide and the alkaline agent may be supplied in stoichiometric quantities by dissolution in water of an alkali or alkaline-earth peroxide. However, in practice, more hydrogen peroxide than necessary in stoichiometry must be added, because this product is not very stable in an alkaline medium and partially decomposes into $O_2$ and $H_2O$ without taking part in the reaction.

The absorption of $ClO_2$ is carried out continuously or discontinuously by any known means, for example in a packed tower or a bubbling apparatus. It is necessary to control the flow of the alkaline and reducing agents added to the absorption liquid phase or medium for several reasons. In the first place, it is advantageous to limit the excess of reagents in the final solution for the excess includes impurities in chlorite and losses. Hydrogen peroxide is unstable in an alkaline medium and more unstable when its concentration and pH are high. Consequently when the excess of reagents is reduced, the losses in hydrogen peroxide are reduced, when it is the reducing agent.

In the second place, if the alkaline hydroxide concentration is too high, the absorption kinetics decrease and the absorption device may then be insufficient, whereby there is a loss of $ClO_2$ to the vent of the apparatus.

In the third place, if there is a lack of alkali or alkaline-earth hydroxide, $ClO_2$ is dissolved in the aqueous phase without chemically reacting. Since its own solubility is limited the major part of it will be lost in the vent.

In the fourth place, if there is an insufficient amount of the reducing agent, the reaction I herein shows that the molecular output in chlorite is limited to 50%. Moreover, its kinetics are so slow that $ClO_2$ molecules pass into the vent without having been absorbed.

To control the flows of alkaline and reducing agents, measurement of the pH of the absorbing medium has been considered. It is known that, when there is no excess of alkali or alkaline-earth hydroxide, the pH of the chlorite solutions is between 4 and 8, and with a slight excess of hydroxide, the pH ranges between 8 and 9.5. However, only the pH measurement is insufficient to separately control the flows of the reducing agent and of the alkaline agent.

In practice, lack of one or both of the alkaline and reducing agents relative to $ClO_2$ results in a physical dissolution of the $ClO_2$ in the aqueous solution, which dissolution in turn produces a change in the color of the solution. The solution becomes green if it is very pure and is generally brown in the presence of traces of iron salts. However, reliance upon this color change does not lead to a satisfactory or efficient control of the reaction.

We have tried to find other means to simultaneously regulate the introduction of the alkaline agent and the reducing agent. In this regard, measurement of an oxido-reduction potential, commonly called "redox potential" 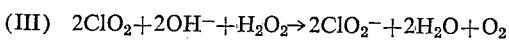
did not seem favorable because of the complexity of the oxidizing reducing system. As a matter of fact, reaction II (or all the elementary reactions summarized by this reaction) involves three individualities of the first member. Furthermore, this reaction is irreversible and it is impossible beforehand to calculate a potential which can take into account the existence of an equilibrium. Additionally, reaction I, which may occur in the absence of reducing agent, is also irreversible. Finally, the use of hydrogen peroxide (as a reducing agent) which has well-known oxidizing properties but in the present case acts as a reducer, may have a complex influence upon the measurement of the redox potential.

Despite this complexity, we observed that measurement of at least one redox potential permitted a good regulation of flow of the reagents.

In the following description, the cited sign and values of the redox potential are those measured with a calomel electrode as reference electrode, and a platinum electrode as measuring electrode. Of course, the invention may be carried out with other kinds of electrodes.

The process is based upon certain observations. More specifically, if chlorine dioxide is bubbled through a solution containing a chlorite and no alkaline or reducing agents, the redox potential is between +300 and +500 mv., and remains within this range for a long time after termination of the bubbling.

If chlorine dioxide is bubbled through a chlorite solution containing both alkaline and reducing agents, the redox potential does not reach a stable value and oscillates between −250 and +500 mv. It becomes stable between −100 and −250 mv. when the bubbling is terminated.

If chlorine dioxide is bubbled through a chlorite solution containing a reducing agent but no alkaline agent, the redox potential is between +300 and +500 mv. and remains there for a few minutes after the bubbling has stopped. If, thereafter, an alkaline agent is added, the redox potential becomes negative and ranges between −100 and −250 mv.

If chlorine dioxide is bubbled through a chlorite solution containing an alkaline agent and no reducing agent, the redox potential is between +300 and +500 mv. and remains within this range for 2 or 3 minutes after the bubbling has stopped. If, thereafter, a reducing agent is added, the redox potential becomes negative and ranges between −100 and −250 mv.

Thus, a redox potential of the chlorite solution between −100 and −250 mv. indicates the simultaneous presence of an alkaline and a reducing agent. If this potential is between +300 and +500 mv., it shows the absence of either both agents, or one of them. This potential value is broken by the introduction of an excess of one of the reagents into the absorption medium.

This invention relates to a process for the production of chlorites of alkali metals or alkaline-earth metals in an aqueous solution by absorption of gaseous chlorine dioxide in a medium such as a solution or a suspension of the corresponding hydroxide which also contains an agent having a reducing action. Both of the alkaline and reducing agents are introduced into the medium as an aqueous solution containing at least one of them. The invention comprises making at least two measurements, preferably continuously, on a sample from the circulating medium. One of the measurements is the redox potential of the medium with or without addition of one of the reagents and the other is the pH of the medium or another redox potential after addition of one of the reagents to the medium. The combined result of these measurings is used for regulating the amount of alkali or alkaline-earth hydroxide and of reducing agent relative to the chlorine dioxide utilized, and for obtaining a chlorite solution of the constant desired concentration. The amount of the alkaline agent added to the medium is that required to obtain a ratio of the alkaline agent to the chlorine dioxide at least equal to an equivalent of alkaline agent per mole of chlorine dioxide. The amount of the reducing agent added to the medium is that required to obtain a ratio of the reducing agent at least equal to an equivalent of reducing agent per mole of chlorine dioxide.

The redox potential is measured by any known means, i.e. a potentiometer or a galvanometer connected between a reference electrode—such as a calomel or a silver chloride electrode—and an attack-proof electrode—such as a platinum or a platinum-gold electrode. The diverse values of the potential hereinafter indicated correspond to the use of a calomel electrode and a platinum electrode, the algebraic value indicated in sign and value being that of the platinum electrode potential relative to the calomel electrode.

The results obtained by the control method of the invention are summarized in the following table wherein the positive potentials are between +300 and 500 mv. and are symbolized by the sign +; the negative potentials are between −100 and −250 mv. and are symbolized by the sign −; the pH below a certain value between 6.5 and 9.5 is symbolized by $n$ and the pH above this value by $a$.

| | Excess of both reagents | Lack of reducing agent | Lack of alkaline agent | Lack of both reagents |
|---|---|---|---|---|
| (A) pH measuring | a | a | n | n |
| (B) Redox potential measuring without addition of reagent | − | + | + | + |
| (C) Redox potential measuring after addition of reducing agent | − | − | + | + |
| (D) Redox potential measuring after addition of alkaline agent | − | + | − | + |

By association of two of these measurings (except A and C), it is possible to know the state of the solution regarding the excess or the dificiency of each of the alkaline or reducing agents.

The measurements of the pH and of the redox potential can easily be recorded with or without electric relay devices and permit ether manual or automatic addition of either agent in the event of a temporary deficiency of same.

The described process is not limitative, and the results of the measurements in the form of signals may be introduced into any suitable regulation device which operates proportionally, integrally or with delay, according to the characteristics of the equipment under control.

In this process, in the part of the circuit where the pH or the redox potentials are measured, it is possible to limit the time during which the amount of the agents is deficient. Therefore, it is preferable to carry out these measurements in the part of the circuit where the excess of the agents is a minimum.

A galvanometric device may be utilized for measuring the redox potential. Such a device is far less costly and more sturdy than a potentiometric device. The sensitivity of the measurement is reduced, but the interesting values are on both sides of potential zero, and with the chosen electrodes, the results are independent of this sensitivity.

The choice of the measurements carried out is free, but it may be made in accordance with the compounds utilized as agents.

The following non-limitative examples, illustrate the invention.

EXAMPLE 1

This example relates to production of sodium chlorite from chlorine dioxide, soda lye and hydrogen peroxide, according to apparatus schematically shown in FIGURE 1.

The flow-rates of soda lye and hydrogen peroxide were regulated by combining the measurements of two redox potentials.

Chlorine dioxide, diluted in air and containing 200 g. $ClO_2$ per m.$^3$, was introduced at the rate of 135 kg./h. into the bottom of an absorbing tower 1 supplied in its upper part with a solution from a tank 2. The instantaneous flow-rate of $ClO_2$ varied between 95 and 105% relative to the hour flow-rate. The absorbing solution was drawn by a pump 15 and sent to the top of the tower after passage through a heat exchanger 16 wherein it lost the calories produced by the dissolving and absorbing reactions. The flow-rate of the absorbing solution was 10 m.$^3$/h.

The utilized reagents were an aqueous 30% by weight solution of NaOH brought through a line 3 into the tower 1 and a 30% by weight aqueous solution of hydrogen peroxide brought to the top of the tower 1 by a line 4. These reagents are mixed at the top of the absorbing tower with the recycled solution coming from the tank 2. The latter solution, when flowing out of the tank 2 contained about 30% by weight $NaClO_2$, 0 to 0.5% by weight NaOH, 0 to 0.3% by weight $H_2O_2$. Its temperature was about 35° C.

Two cells 5 and 6 for measuring the redox potential were placed in parallel between the bottom of the tower 1 and the tank 2. Each cell comprised a calomel and a platinum electrode connected to high resistance galvanometers 9 and 10. 200 kg./h. of solution flowed through each cell.

At a given time, the flow-rate of the sodium hydroxide solution arriving at the top of the tower was 235 kg./hour. This flow-rate was insufficient and after a delay of about 2 minutes (due to the time-constant of the tower) there appeared a deficiency of NaOH in the solution from the tower. This deficiency was selectively detected in cell 5 supplied with 200 kg./h. of solution from the tower added by line 7 with 3 kg./h. of aqueous solution at 30% $H_2O_2$. The potential measured in cell 5 was then +500 mv. The soda lye flow-rate to the top of the tower then reached 315 kg./h., an excess relative to the average necessary flow-rate. About two minutes later, there appeared an excess of NaOH in the solution from the tower and the potential measured in cell 5 passed from +500 mv. to −200 mv.

Then the flow-rate of soda lye was brought back to 235 kg./h. and so on . . . .

At a given time, the flow-rate of the hydrogen peroxide solution introduced to the top of the absorption tower was 120 kg./h. This flow-rate being insufficient, a lack of $H_2O_2$ appeared in the solution coming from the tower after about 2 minutes. This lack was selectively detected in cell 6 supplied with 200 kg./h. of solution from the tower added by line 8 with 5 kg./h. of aqueous solution of 30% sodium hydroxide. The measured potential was then +500 mv. The hydrogen peroxide flow-rate to the top of the tower was then brought to 170 kg./h., an excess relative to the average necessary amount. About 2 minutes later an excess of $H_2O_2$ appeared in the solution from the tower and the potential measured in cell 6 passed from +500 mv. to −200 mv. The flow-rate of the hydrogen peroxide solution was then brought back to 120 kg./h.

The regulating system could be utilized by manual working of valves 11 and 12, but the regulation was preferably carried out automatically by an appropriate amplification of the signals generated by galvanometers 9 and 10. In such a system, the variations of the chlorine dioxide flow-rate were balanced around the average value of 2 minutes by the variations of the times during which the flow-rates of the reagents were below or above the average flow-rate. A temporary increase of the $ClO_2$ flow-rate resulted in a prolongation beyond 2 minutes of the time during which the soda lye was supplied at the rate of 315 kg./h. and the hydrogen peroxide at 170 kg./h., and in a shortening to less than 2 minutes of the times during which the soda lye was supplied at 235 kg./h. and the hydrogen peroxide at 120 kg./h.

Of course, to these supply rates to the top of the tower must be added the continuous flows of 3 kg./h. $H_2O_2$ in line 7 and of 5 kg./h. NaOH solution in line 8 which were introduced into the cycle and were consumed therein as reagents.

A supplementary addition of 60 kg./h. water was sent through pipe 13 into the tank 2 to adjust the final chlorite solution overflowing through line 14 at 30% by weight of $NaClO_2$. This solution contained 0 to 0.5% NaOH. The presence of free sodium hydroxide is favorable to the stability of the sodium chlorite solution.

The average flow-rate of the sodium chlorite solution flowing out of the tank 2 through line 14 was 600 kg./h.

EXAMPLE 2

Figure 2:
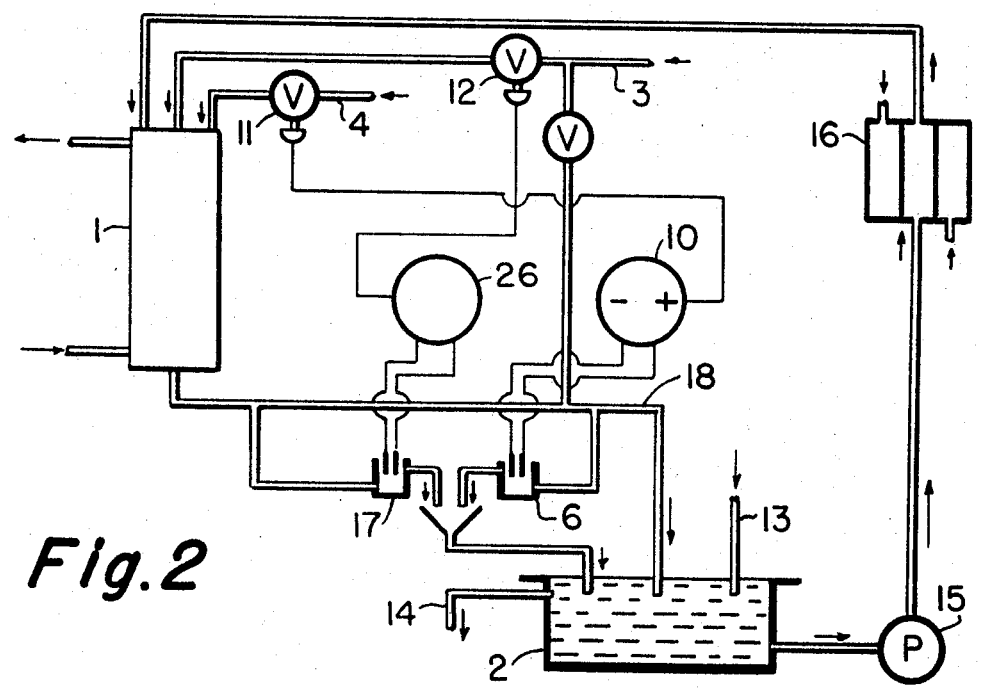

Potassium chlorite was produced from chlorine dioxide, potash and hydrogen peroxide according to the apparatus schematically shown by FIGURE 2.

The flow-rates of alkaline hydroxide and reducing agent were regulated by combining a redox potential measurement and a pH measurement.

The operation was carried out with the same flow-rates of chlorine dioxide and hydrogen peroxide as in the preceding example. The potash solution was 40% by weight.

In FIGURE 2, reference numerals 1, 2, 3, 4, 6, 10, 11, 12, 13, 14, 15 and 16 represent the same elements as in FIGURE 1.

One portion of the potash solution was introduced through a line 18 into the pipe which connects the bottom of the tower 1 to the tank 2. The flow-rate was constant and equal to 80 kg./h. The other portion of the potash solution was introduced to the top of the absorbing tower 1 through the line 3 at a rate varying between 160 and 240 kg./h. The hydrogen peroxide solution was introduced to the top of the absorbing tower 1 through the line 4.

A pH measuring cell 17 connected to a measuring apparatus 26 was placed in parallel between the bottom of the tower 1 and the tank 2, the sample for the cell 17 being obtained above the potash solution inlet through the line 18. This cell detected a deficiency of the potassium hydroxide solution. When the measurement indicated a pH above 8.5, the total flow-rate of KOH solution was 240 kg./h. (80 kg./h. in line 18 and 160 kg./h. in line 3). When the measurement indicated a pH below 8.5, the total flow rate of the solution was brought to 320 kg./h. (80 kg./h. in line 18 and 240 kg./h. in line 3).

A cell 6 for measuring the redox potential was placed in parallel between the bottom of the tower 1 and the tank 2. This cell was supplied below the potash solution inlet through the line 18. Because of the previous supply of potash solution, the cell was sensitive only to a deficiency of hydrogen peroxide. When the measured potential was negative, the $H_2O_2$ solution flow-rate settled at 125 kg./h. When the measured potential was positive, the flow-rate of the $H_2O_2$ solution was brought to 175 kg./h.

A supplementary addition of water of 530 kg./h. was sent through the pipe 13 into the tank 2. This addition adjusted the content of the final solution overflowing through line 14 at 20% $KClO_2$. It contained 20% $KClO_2$ and 0.2 to 0.7% KOH. This potash is favorable to the stability of the potassium chlorite solution. The average flow-rate of the removed solutions was 1.050 kg./h.

EXAMPLE 3

Sodium chlorite was prepared and the flow-rate of alkaline and reducing agents were regulated by combining a redox potential measurement and a pH measurement.

Figure 3:
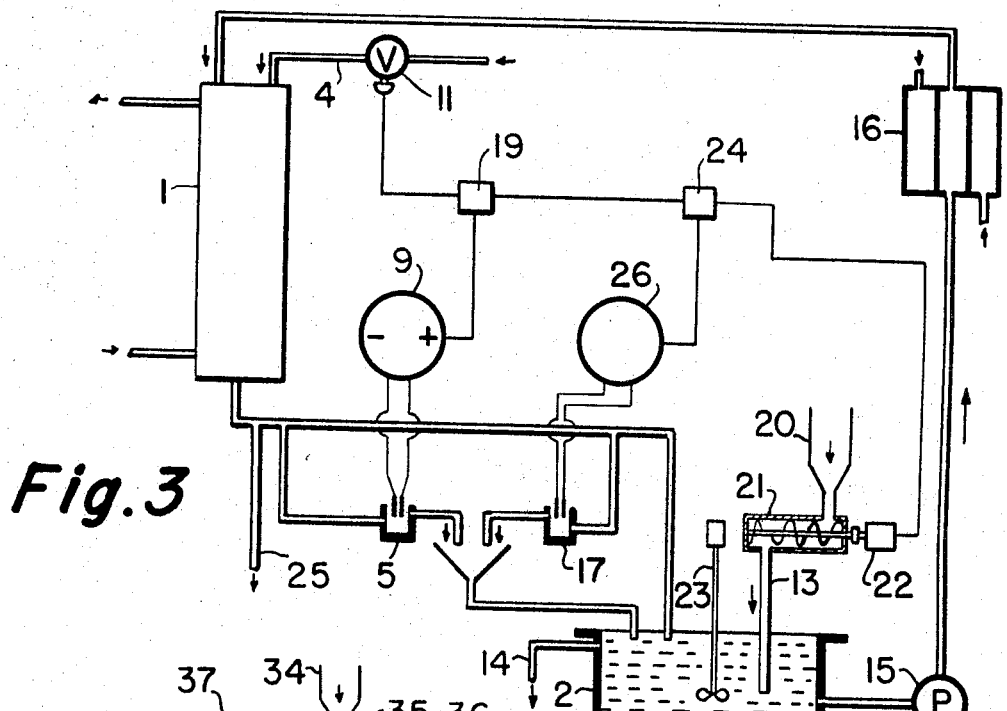

The operation was carried out with the same $ClO_2$ flow-rate as in the preceding examples according to apparatus schematically illustrated in FIGURE 3, in which reference numerals 1, 2, 4, 5, 9, 11, 15 and 16 identifying the same elements as in FIG. 1.

The utilized reagent was pulverulent sodium peroxide and a solution of hydrogen peroxide at 30% $H_2O_2$ by weight. Sodium peroxide was introduced into the tank 2 through a funnel 20 and a screw feeder 21. The screw feeder was operated by a variable speed mechanism 22. Sodium peroxide entered the tank which was provided with a stirrer 23. By hydrolysis it gave a solution of NaOH and $H_2O_2$. The flow-rate of the screw feeder 21 was 70–100 kg./h. Hydrogen peroxide was introduced into the top of the tower through the line 4 at a rate between 0 and 60 kg./h.

A pH measuring cell 17 was placed in parallel between the bottom of the tower 1 and the tank 2. This cell detected a deficiency of the alkaline agent in the solution. When the measurement indicated a pH above 8.5, the flow-rate of the sodium peroxide introduced through the screw feeder 21 was 70 kg./h. When the measurement indicated a pH below 8.5, the flow-rate of sodium peroxide introduced through the screw feeder 21 was brought to 100 kg./h. The mechanism 22 was operated by a relay device 24, connected to the apparatus for measuring pH 26.

A cell 5 for measuring the redox potential was placed in parallel between the bottom of the tower 1 and the tank 2. This cell indifferently detected a deficiency of the alkaline agent and of the reducing agent. However, when the pH was above 8.5 (NaOH in excess) and simultaneously a positive potential positive (lack of one reagent) there was a deficiency of $H_2O_2$.

In this case the double relay device 19–24 effected an increase in the flow-rate of hydrogen peroxide to the top of the absorbing tower 1 to 60 kg./h., by modifying the opening of the valve 11. When both above-mentioned conditions were not fulfilled simultaneously, the relay device maintained valve 11 closed.

An addition of 390 kg./h. water was sent into the tank 2 through the pipe 13 to adjust concentration in the final chlorite solution overflowing through the line 14 at 30% the NaClO₂. The average flow-rate was 600 kg./h. The solution contained 30% by weight NaClO₂ and 0.7 to 1.2% free NaOH.

The content of free sodium hydroxide could be lowered by regularly drawing off the solution from the bottom of the absorbing tower 1 at the rate of 500 kg./h., through a line 25 with the NaOH content of the solution varying between 0 and 0.5%. The surplus of final chlorite solution overflowed through the line 14.

EXAMPLE 4

Figure 4:
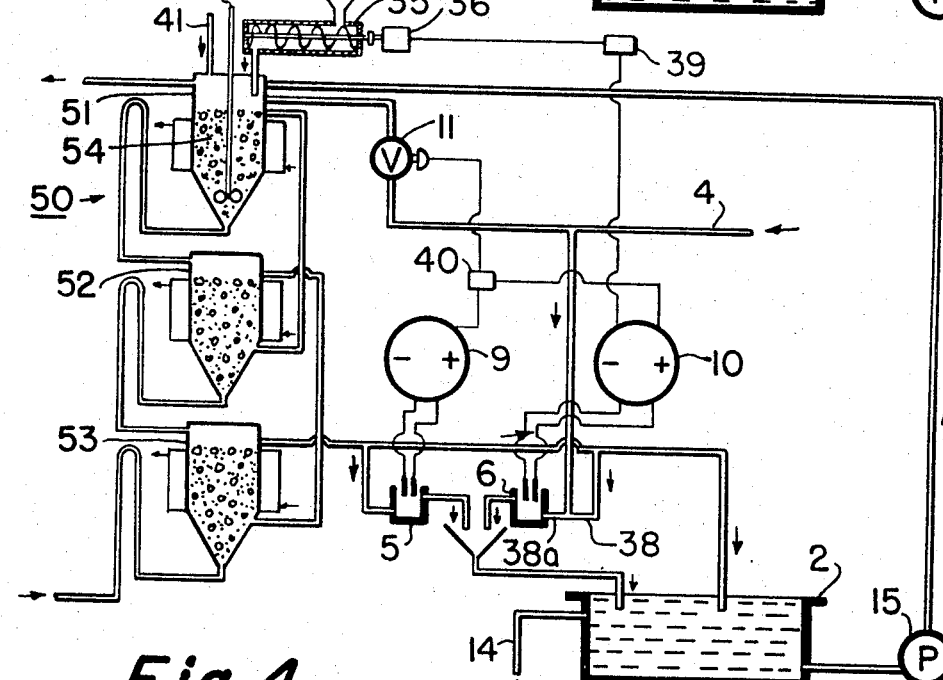

Calcium chlorite was prepared and the flow-rates of the alkaline and reducing agents were regulated by combining two measurements of redox potential. The operation was carried out with the same ClO₂ flow-rate as in the preceding examples according to apparatus schematically shown by FIGURE 4. The diluted chlorine dioxide was absorbed in apparatus 50 formed of three series arranged bubblers 51, 52 and 53. These bubblers were filled with a solution flowing counter-current to chlorine dioxide diluted with an inert gas, and sent from a tank 2 through a pump 15. The flow-rate of the solution supplied by the pump was 20 m.³/h. Each bubbler was cooled down by a double casing wherein water was circulated.

The utilized reagents were calcium peroxide and hydrogen peroxide. Pulverulent calcium peroxide was introduced into the upper bubbler 51 through a funnel 34, provided with a feed screw 35, operated by a variable-speed mechanism 36. A stirrer 37 insured a good dispersion of the suspension 54 which was formed. By hydrolysis, calcium peroxide gave calcium hydroxide and hydrogen peroxide. The flow-rate of the feed screw varied between 60 and 90 kg./h. CaO₂. A 30% hydrogen peroxide solution was introduced through line 4 into the upper bubbler 51 at a rate between 0 and 50 kg./h.

A cell 6 for measuring the redox potential was placed in parallel between the lower bubbler 53 and the tank 2. This cell was supplied with 200 kg./h. of a solution to which were added 3 kg./h. of the 30% hydrogen peroxide solution through a line 38, into the feed pipe 38a. This cell detected a deficiency of Ca(OH)₂ in the absorption solution. If the potential reading on the galvanometer 10 was negative (excess of Ca(OH)₂), the relay 39 operated the mechanism 36 and the feed screw 35 to progressively lower the reagent flow-rate to 60 kg./h. If the potential was positive (deficiency of Ca(OH)₂) the output from the line 38 was a progressive increase of the flow-rate to 90 kg./h.

Another cell 5 for measuring the redox potential was also placed between the lower bubbler 53 and the tank 2. When the potential measured by the cell 5 and read on the galvanometer 9 was positive (deficiency of one or of both agents) and the potential measured by cell 6 and read on the galvanometer 10 was negative (excess of Ca(OH)₂), there was only a deficiency of H₂O₂ and the relay device 40 operated the valve 11 to progressively increase the flow-rate of the hydrogen peroxide solution up to 50 kg./h. maximum. When both potential conditions hereabove mentioned were not realized simultaneously, relay 40 operated to progressively lower the hydrogen peroxide flow-rate down to 0 kg./h.

About 500 kg./h. water were added through a pipe 41 into the upper bubbler 51. This addition adjusted the content of the solution resulting from the process to 25% Ca(ClO₂)₂. Solution was extracted at the rate of 700 kg./h. by overflow from the tank 2 through the line 14. In addition to the Ca(ClO₂)₂, the resulting solution contained 0.1 to 0.2% Ca(OH)₂.

While we have shown and described preferred embodiments of our invention, it may be otherwise embodied within the scope of the appended claims.

We claim:
1. In a process for the continuous production of chlorites of alkali metals and alkaline earth metals in an aqueous solution by absorption of gaseous chlorine dioxide in a medium selected from the group consisting of an aqueous solution and an aqueous suspension of an alkaline agent selected from the group consisting of alkali metal and alkaline earth metal hydroxides, which contains also an agent having a reducing action, the invention comprising making two measurements of said medium, one of said measurements being the redox potential of the medium and the other of said measurements being one of pH and of redox potential after addition of one of said alkaline and reducing agents to said medium, utilizing the results of said two measurements to determine excess and deficiency of said alkaline and reducing agents in said medium, increasing and decreasing the amount of at least one of said alkaline agent and said reducig agent added to said medium to obtain a chlorite solution of a constant desired concentration, the amount of said alkaline agent added being that required to obtain a ratio of said alkaline agent to chlorine doxide at least equal to an equivalent of alkaline agent per mole of chlorine dioxide, the amount of said reducing agent being that required to obtain a ratio of said reducing agent to chlorine dioxide at least equal to an equivalent of reducing agent per mole of chlorine dioxide.

2. The invention of claim 1 wherein said two measurements are carried out substantially continuously.

3. The invention of claim 1, wherein said first measurement is the redox potential of the medium and is made prior to the addition of one of said agents.

4. The invention of claim 1, wherein both said measurements are made after the addition of one of said agents.

5. The process of any one of claims 1, 2, 4 and 5, wherein each of said two measurements is made of a sample of said medium.

References Cited

UNITED STATES PATENTS

| | | | |
|---|---|---|---|
| 2,092,944 | 9/1937 | Vincent | 23—85 |
| 2,092,945 | 9/1937 | Vincent | 23—85 |
| 2,194,194 | 3/1940 | Cunningham | 23—85 |
| 2,332,180 | 10/1943 | Soule | 23—85 |
| 2,616,783 | 11/1952 | Wagner | 23—85 |
| 2,926,996 | 3/1960 | Kooistra | 23—85 |
| 3,199,949 | 10/1965 | Clerbois et al. | 23—86 |

EDWARD STERN, *Primary Examiner.*

U.S. Cl. X.R.

23—152, 230, 253